United States Patent
Carrasco et al.

(10) Patent No.: US 10,411,531 B2
(45) Date of Patent: Sep. 10, 2019

(54) STATOR ASSEMBLY AND MAGNETIC BEARING OR ELECTRIC MOTOR HAVING SUCH A STATOR ASSEMBLY

(71) Applicants: Eduardo Carrasco, Saint Etienne sous Bailleul (FR); Eddy Herisse, les Andelys (FR)

(72) Inventors: Eduardo Carrasco, Saint Etienne sous Bailleul (FR); Eddy Herisse, les Andelys (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 183 days.

(21) Appl. No.: 15/077,396

(22) Filed: Mar. 22, 2016

(65) Prior Publication Data
US 2016/0285324 A1    Sep. 29, 2016

(30) Foreign Application Priority Data
Mar. 26, 2015    (EP) .................................... 15305445

(51) Int. Cl.
| | | |
|---|---|---|
| *H02K 7/00* | (2006.01) | |
| *H02K 1/18* | (2006.01) | |
| *F16C 32/04* | (2006.01) | |
| *H02K 5/04* | (2006.01) | |
| *H02K 7/09* | (2006.01) | |

(52) U.S. Cl.
CPC ........... *H02K 1/185* (2013.01); *F16C 32/047* (2013.01); *H02K 5/04* (2013.01); *H02K 7/09* (2013.01)

(58) Field of Classification Search
CPC ............ H02K 1/185; H02K 1/18; H02K 5/04; H02K 7/09; H02K 1/182; H02K 5/24; F16C 32/047
USPC ......... 310/413, 415, 431–433, 427, 216.058, 310/216.083, 216.127–216.129, 216.084; 29/732, 402.15
See application file for complete search history.

(56) References Cited

U.S. PATENT DOCUMENTS

| | | | | |
|---|---|---|---|---|
| 2,251,674 | A * | 8/1941 | Gillen | H02K 17/10 310/172 |
| 5,363,547 | A | 11/1994 | Brown | |
| 5,742,991 | A * | 4/1998 | Kurth | B29C 45/1747 254/29 A |
| 5,850,679 | A * | 12/1998 | Hoffman | B25B 27/026 29/252 |
| 6,225,722 | B1 * | 5/2001 | Rupp | H02K 21/22 310/91 |
| 6,553,645 | B2 | 4/2003 | Nakamura et al. | |

(Continued)

FOREIGN PATENT DOCUMENTS

| | | |
|---|---|---|
| CN | 101501959 A | 8/2009 |
| CN | 102638144 A | 8/2012 |

(Continued)

*Primary Examiner* — Julio C. Gonzalez
*Assistant Examiner* — Maged M Almawri
(74) *Attorney, Agent, or Firm* — Bryan Peckjian; SKF USA Inc. Patent Dept.

(57) ABSTRACT

A stator assembly having a housing and a stator that are concentric, the stator being mounted radially inside the housing is provided. This stator assembly includes fastening elements that are mounted between a radial inner surface of the housing and a radial outer surface of the stator and exert a radial fastening force on the housing and the stator.

11 Claims, 6 Drawing Sheets

(56) References Cited

U.S. PATENT DOCUMENTS

| | | | |
|---|---|---|---|
| 7,827,668 B2 * | 11/2010 | McKee | E21B 17/02 285/256 |
| 7,982,356 B2 | 7/2011 | Buban | |
| 8,823,239 B2 | 9/2014 | Ossenkopp | |
| 9,263,921 B2 * | 2/2016 | Tanavde | H02K 1/16 |
| 9,496,770 B2 | 11/2016 | Grillenberger et al. | |
| 9,917,500 B2 | 3/2018 | Fleck et al. | |
| 2004/0217669 A1 | 11/2004 | Fujii et al. | |
| 2005/0034295 A1 * | 2/2005 | Meacham | F16C 32/0468 29/598 |
| 2008/0203837 A1 | 8/2008 | Tang | |
| 2009/0289522 A1 * | 11/2009 | Buban | H02K 1/148 310/216.113 |
| 2010/0187944 A1 | 7/2010 | Ossenkopp et al. | |
| 2013/0089428 A1 * | 4/2013 | Hottier | B21K 3/04 416/223 R |
| 2014/0231483 A1 * | 8/2014 | Takaichi | H02K 15/03 225/1 |
| 2014/0360334 A1 * | 12/2014 | Singer-Schnoeller | B23B 31/11 83/698.11 |
| 2015/0000114 A1 * | 1/2015 | Matsushita | H01F 41/0266 29/607 |
| 2015/0143691 A1 * | 5/2015 | Takaichi | H02K 15/03 29/738 |
| 2016/0285324 A1 | 9/2016 | Carrasco et al. | |
| 2016/0285342 A1 | 9/2016 | Carrasco et al. | |

FOREIGN PATENT DOCUMENTS

| | | |
|---|---|---|
| DE | 10261617 A1 | 7/2004 |
| DE | 10332958 A1 | 2/2005 |
| EP | 2084806 B1 | 10/2012 |
| JP | 2002078253 A | 3/2002 |
| JP | 2005073397 A | 3/2005 |
| WO | 2008019818 A1 | 2/2008 |

* cited by examiner

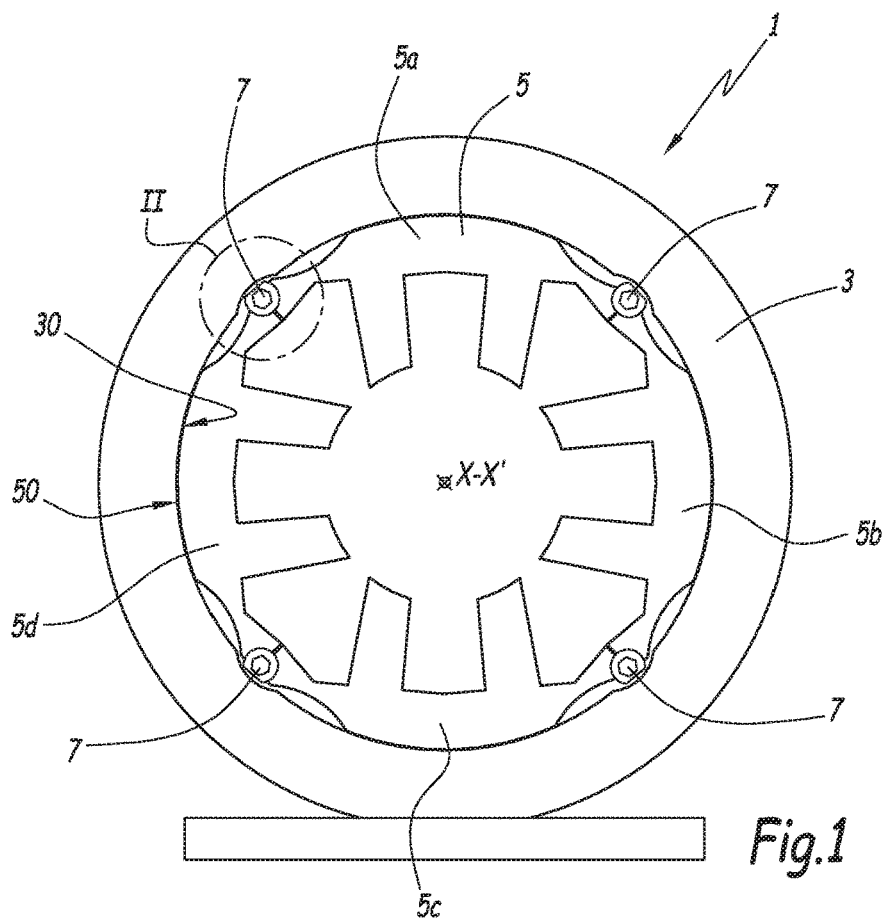
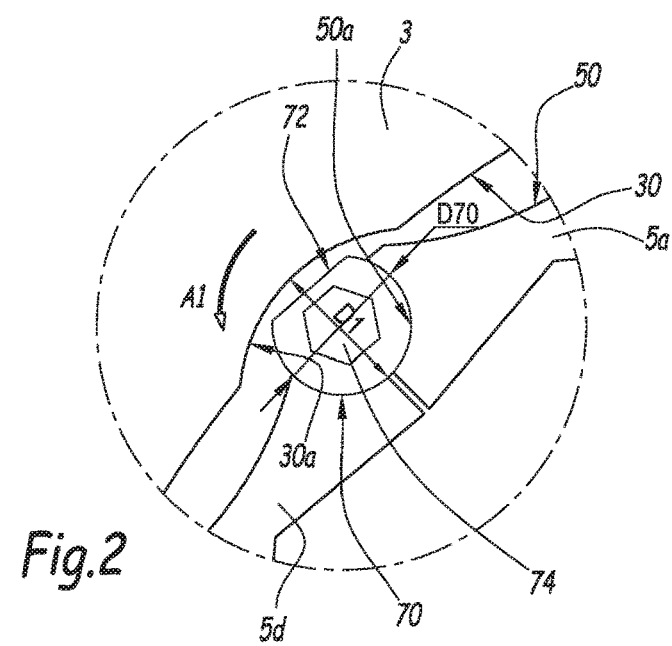

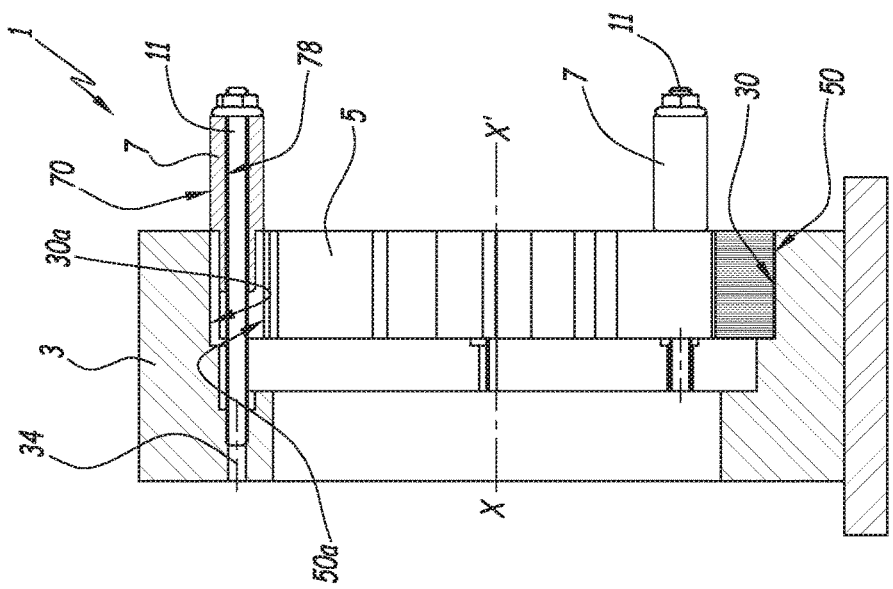
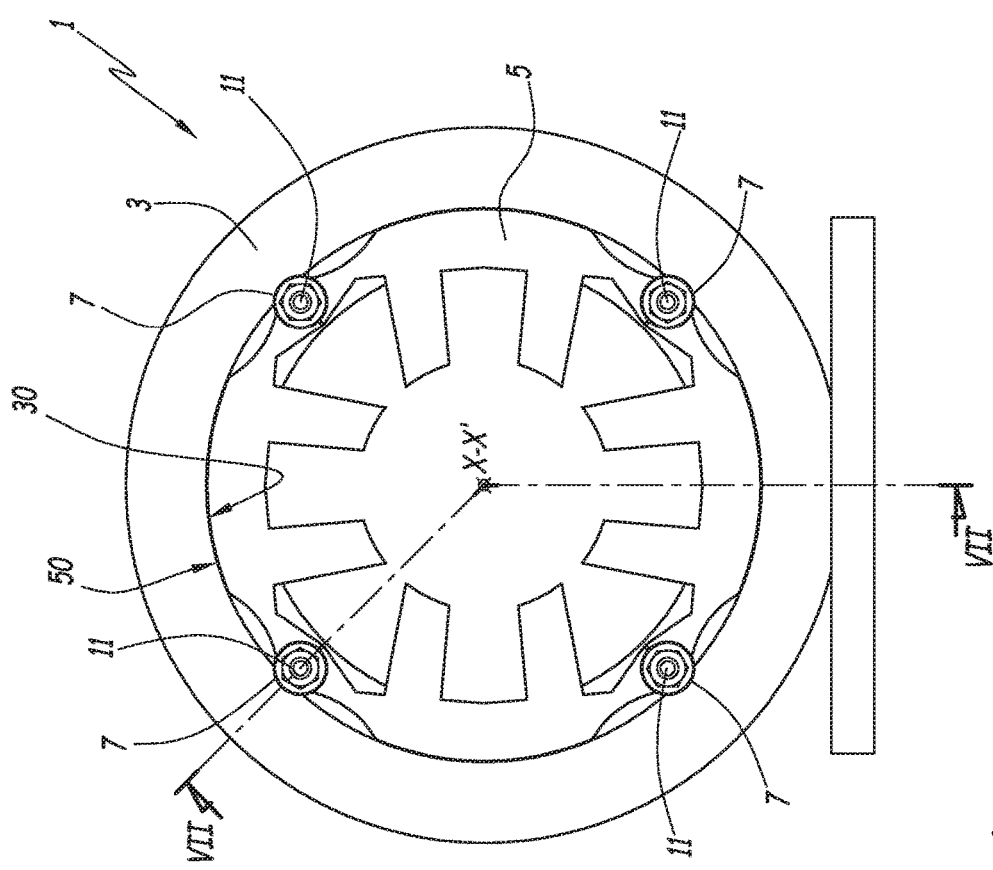

STATOR ASSEMBLY AND MAGNETIC BEARING OR ELECTRIC MOTOR HAVING SUCH A STATOR ASSEMBLY

CROSS-REFERENCE TO RELATED APPLICATIONS

This application claims priority to European patent application no. 15305445.7 filed on Mar. 26, 2015, the contents of which are fully incorporated herein by reference.

TECHNICAL FIELD OF THE INVENTION

The present invention relates to a stator assembly having a housing and a stator. This invention further relates to a magnetic bearing or an electric motor comprising such a stator assembly.

BACKGROUND OF THE INVENTION

The motor stators or the magnetic actuators for magnetic bearings cannot always be centered and fastened to their housing using fasteners as screws or rivets. To reduce the size of the assembly or to facilitate its manufacturing, the stators are often shrink fitted to their housings. A shrinkage interference of the diameters of the stator and the housing must be computed relative to the size of the parts or the environmental conditions of the assembly on the basis of the thermal elongation of the materials used.

Currently the shrinkage of two assemblies or of an assembly into its housing is done by thermal expansion. The external assembly or the housing is heated to a certain temperature to obtain an expansion bigger than the shrinkage value, allowing a free insertion of the inner assembly, and then the two parts are cooled to the same temperature to obtain the shrinkage.

This current method requires a heater which needs to be in accordance to the size of the parts to be heated and high precision during the insertion to prevent a partial shrinkage. When the parts get stuck at a wrong position, the assembly is lost, since the only way to recover some parts is to destroy the assembly. The final position of an assembly of this kind is fixed often by a shoulder that gives the final position and no adjustment is possible.

SUMMARY OF THE INVENTION

The aim of the invention is to provide a new stator assembly in which the stator is fastened to the housing with simpler means than with shrinkage techniques.

To this end, the invention concerns a stator assembly having a housing and a stator which are concentric, the stator being mounted radially inside the housing. This stator assembly is characterized in that it provides fastening elements mounted between a radial inner surface of the housing and a radial outer surface of the stator and which exert a radial fastening force on the housing and the stator.

Thanks to the invention, the fastening of the stator on the housing is obtained with simple and less costly means. As there is no use of heating of the complete housing, the positioning of the stator in the housing can be more accurately obtained, since there is no need to quickly assemble the housing around the stator because of the spontaneous cooling down of the housing at ambient temperature.

According to further aspects of the invention which are advantageous but not compulsory, such a stator assembly may incorporate one of several of the following features:

The inner radial surface of the housing and the outer radial surface of the stator provide respective recesses for receiving the fastening elements.

The fastening elements have a global cylindrical shape defining an outer cylindrical surface of a diameter which is superior to a maximal distance extending between the recesses of the inner radial surface of the housing and the recesses of the outer radial surface of the stator.

The fastening elements have a flat longitudinal surface which truncates their outer cylindrical surface.

The fastening elements are adapted to be rotated around their longitudinal axis between a first position, in which the flat longitudinal surface faces the recess of the housing so that the fastening elements can be inserted between the housing and the stator, and a second position, in which the flat longitudinal surface faces the recess of the stator while a portion of the outer cylindrical surface is in contact with the recess of the housing so that the radial force is exerted.

The recesses of the outer radial surface of the stator have a cylindrical shape defining a diameter equivalent to the outer diameter of the fastening elements.

The fastening elements provide an end having a recess adapted for the insertion of a tool for rotating the fastening elements.

The fastening elements are directly inserted between the housing and the stator by force.

The fastening elements provide an internal passage, and the housing provides threaded bores for receiving screws passed through the internal passages of the fastening elements for progressively inserting by force the fastening elements between the housing and the stator.

The fastening elements are directly inserted between the housing and the stator by thermal compression.

The stator assembly provides cylindrical sleeves mounted between the recesses of the inner radial surface of the housing and the recesses of the outer radial surface of the stator, whereas the fastening elements are mounted in the sleeves, and whereas the fastening elements have a global cylindrical shape defining an outer cylindrical surface of a diameter which is superior to the inner diameter of the sleeves.

The stator is made or four separate parts and the stator assembly provides four fastening elements mounted at the interfaces of the four separate parts of the stator.

The stator is made of a unique monolithic part.

The stator assembly provides at least one screw for locking the angular position of the stator with respect to the housing, the screw being inserted into a threaded bore of the housing extending in a centripetal direction and which exerts a radial force against the radial outer surface of the stator.

The invention also relates to a magnetic bearing or an electric motor having a stator assembly as mentioned hereabove.

BRIEF DESCRIPTION OF THE DRAWINGS

The invention will now be explained in correspondence with the annexed figures, as an illustrative example. In the annexed figures:

FIG. 1 is a front view of a stator assembly according to a first embodiment of the invention, in a first configuration;

FIG. 2 is a view at a larger scale of detail II of FIG. 1;

FIG. 6 is a front view of a stator assembly according to a third embodiment of the invention;

FIG. 7 is a sectional view along plane VII-VII of the stator assembly of FIG. 6, in a first configuration;

DETAILED DESCRIPTION OF SOME EMBODIMENTS

Figure 3:
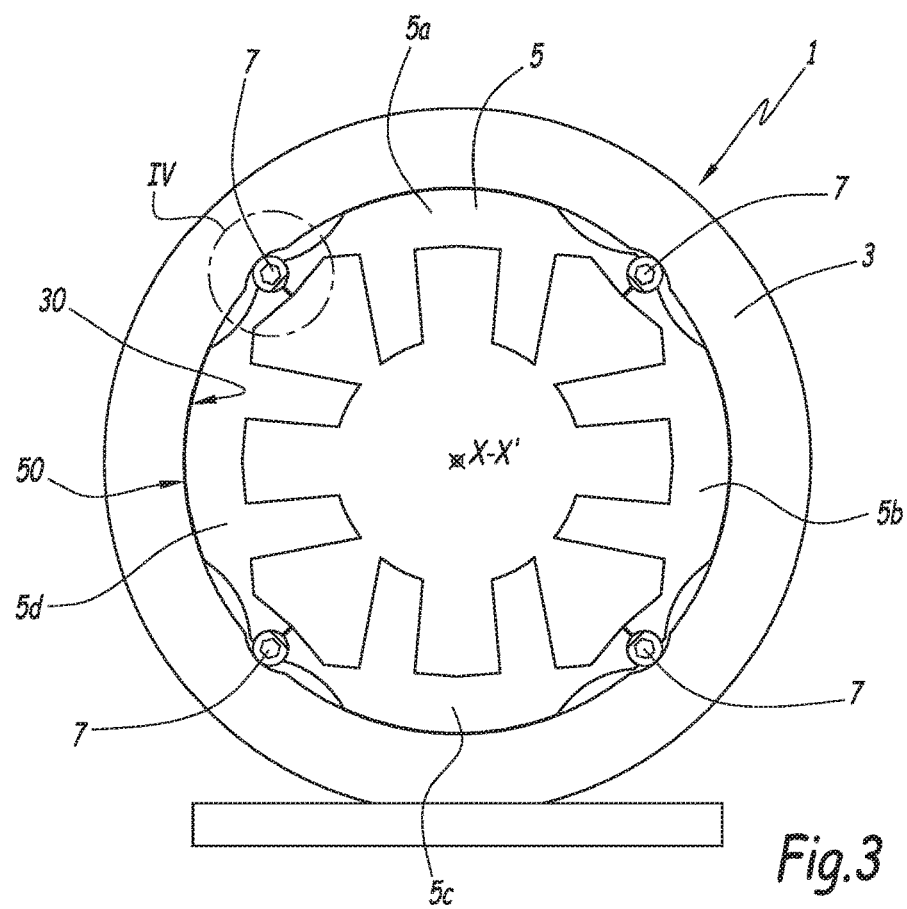
FIG. 3 is a front view of the stator assembly of FIG. 1, in a second configuration.

A stator assembly 1 is represented in FIG. 1. The stator assembly 1 provides a housing 3 and a stator 5, which are concentric and centered on a central axis X-X'. The stator 5 is mounted radially inside the housing 3.

The stator 5 can be made of magnetized laminations of a metallic material. The stator is made or four separate parts 5a, 5b, 5c and 5d.

The stator assembly 1 may belong, for example, to an electrical motor or to a magnetic bearing.

The stator assembly 1 provides fastening elements 7 mounted between a radial inner surface 30 of the housing 3 and a radial outer surface 50 of the stator 5 which exert a radial fastening force F on the housing 3 and the stator 5. This radial force F locks the housing 3 and the stator 5 in relative rotation around axis X-X' and in translation along axis X-X'. Preferably, the stator assembly 1 provides four fastening elements 7 mounted at the interfaces of the four separate parts 5a to 5d of the stator 5.

The inner radial surface 30 and the outer radial surface 50 provide respective recesses 30a and 50a for receiving the fastening elements 7.

The fastening elements 7 have a global cylindrical shape defining an outer cylindrical surface 70 of a diameter D70 which is superior to a maximal distance D1 extending between the recesses 30a and 50a. This permits to obtain the exertion of the radial force F. The fastening elements 7 are more specifically inserted in the recesses 50a, which have a cylindrical shape defining a diameter equivalent to the outer diameter D70.

The fastening elements 7 have a flat longitudinal surface 72 which truncates their outer cylindrical surface 70. As shown on FIGS. 1 and 2, this flat surface 72 allows inserting the fastening elements 7 between recesses 30a and 50a, in a first position, in which the flat longitudinal surface 72 faces the recess 30a.

Figure 4:
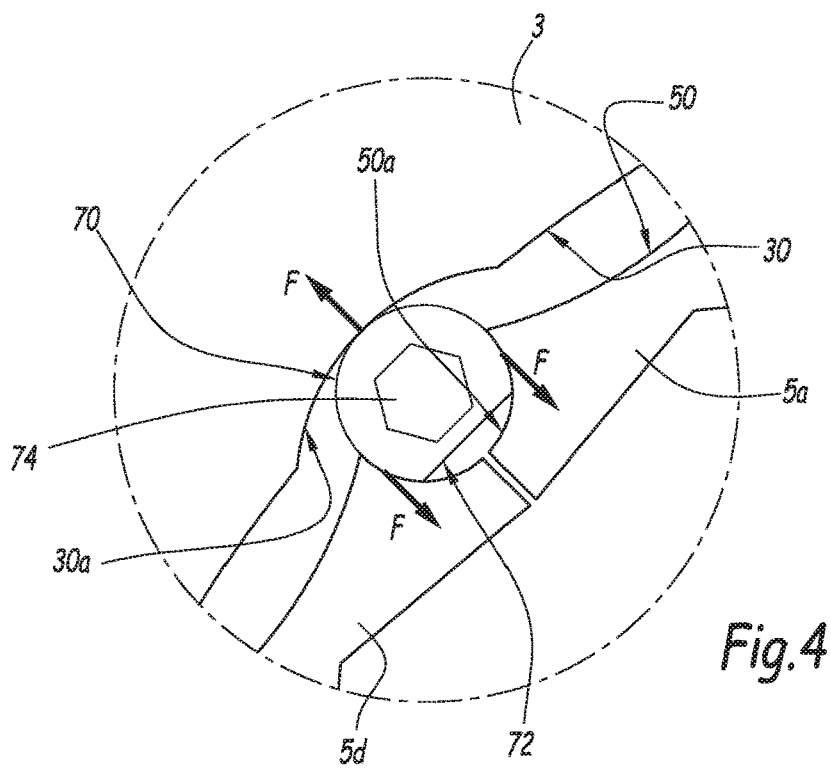
FIG. 4 is a view at a larger scale of detail IV on FIG. 3.

After the fastening elements have been inserted between the recesses 30a and 50a, the fastening elements 7 are rotated, along arrow A1 on FIG. 2, with respect to the recesses 50a around their longitudinal axis from their first position towards a second position, represented on FIGS. 3 and 4, which is approximately diametrically opposed to the first position. In this second position, the flat longitudinal surface 72 faces the recess 50a, while a portion of the outer cylindrical surface 70 is in contact with the recess 30a. In this position, because of the geometrical dimensions of the fastening elements 7 and the recesses 30a and 50a, the radial force F is exerted and the stator 5 and the housing 3 are fastened together.

The fastening elements 7 may provide an axial end having a recess 74 adapted for the insertion of a non-shown tool for rotating the fastening elements 7 around their longitudinal axis.

Second, third and fourth embodiments of the invention are represented on FIGS. 5 to 11. In these embodiments, elements common to the first embodiment have the same reference and work in the same way. Only the differences with respect to the first embodiment are detailed hereafter.

Figure 5:
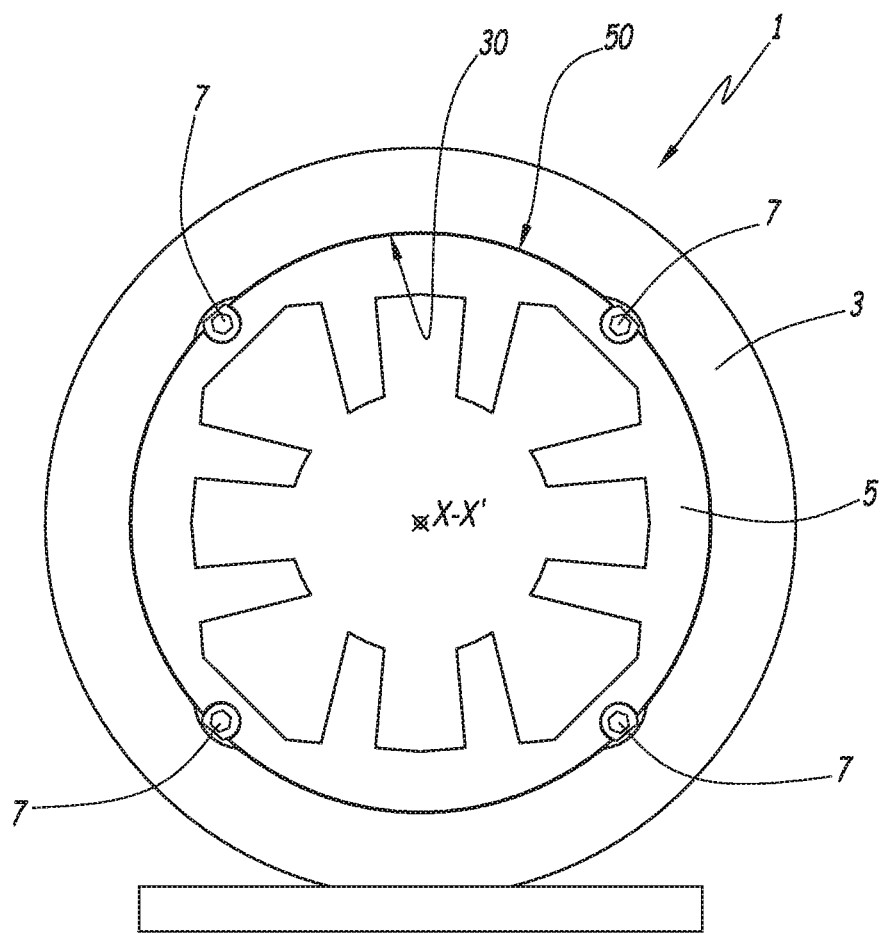
FIG. 5 is a front view of a stator assembly according to a second embodiment of the invention.

In the embodiment of FIG. 5, the stator 5 is made of a unique monolithic part. In such a case, the fastening elements 7 are preferably inserted in locations of the stator assembly distributed regularly around the circumference of the stator 5.

Figure 8:
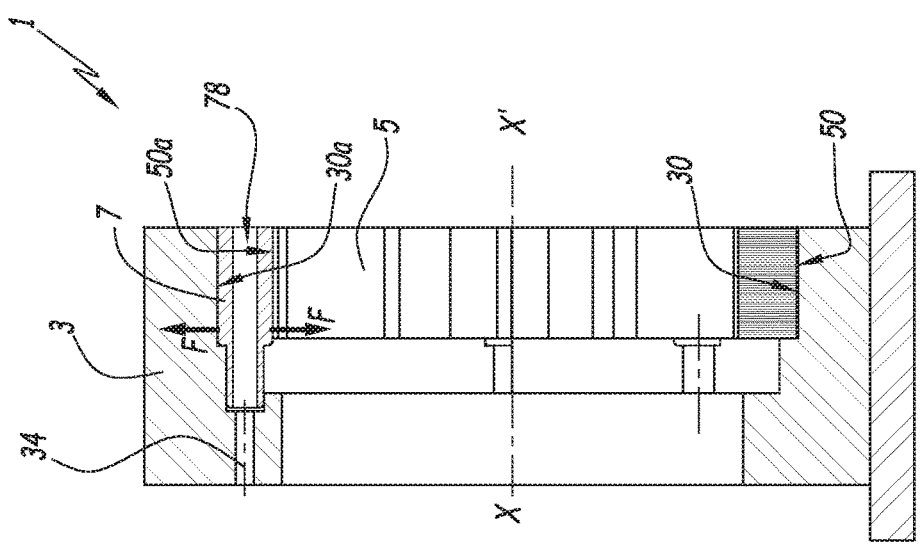
FIG. 8 is a sectional view similar to FIG. 7, in a second configuration.

In the embodiment of FIGS. 6 to 8, the fastening elements 7 are directly inserted between the housing 3 and the stator 5. In such a case, the fastening elements 7 may be inserted by force. As shown on FIGS. 7 and 8, the fastening elements 7 may be hollow and provide an internal passage 78 for passing screws 11 which are screwed in threaded bores 34 of the housing 3. When the screws 11 are rotated, using a non-shown tool, they are progressively inserted in the bores 34 and induce the insertion by force of the fastening elements 7 between recesses 30a and 50a, as represented on FIG. 7. When the fastening elements 7 are completely inserted, as represented on FIG. 8, the screws 11 can be unscrewed from the bores 34 and extracted from the fastening elements 7.

According to a non-shown embodiment, the fastening elements 7 may be inserted between the housing 3 and the stator 5 by thermal compression. The fastening elements 7 may be cooled down in order to reduce their outer diameter so that the fastening elements 7 can be inserted between recesses 30a and 50a, then brought back to ambient temperature after their insertion in order to obtain the fastening of the stator assembly 1.

Figure 9:
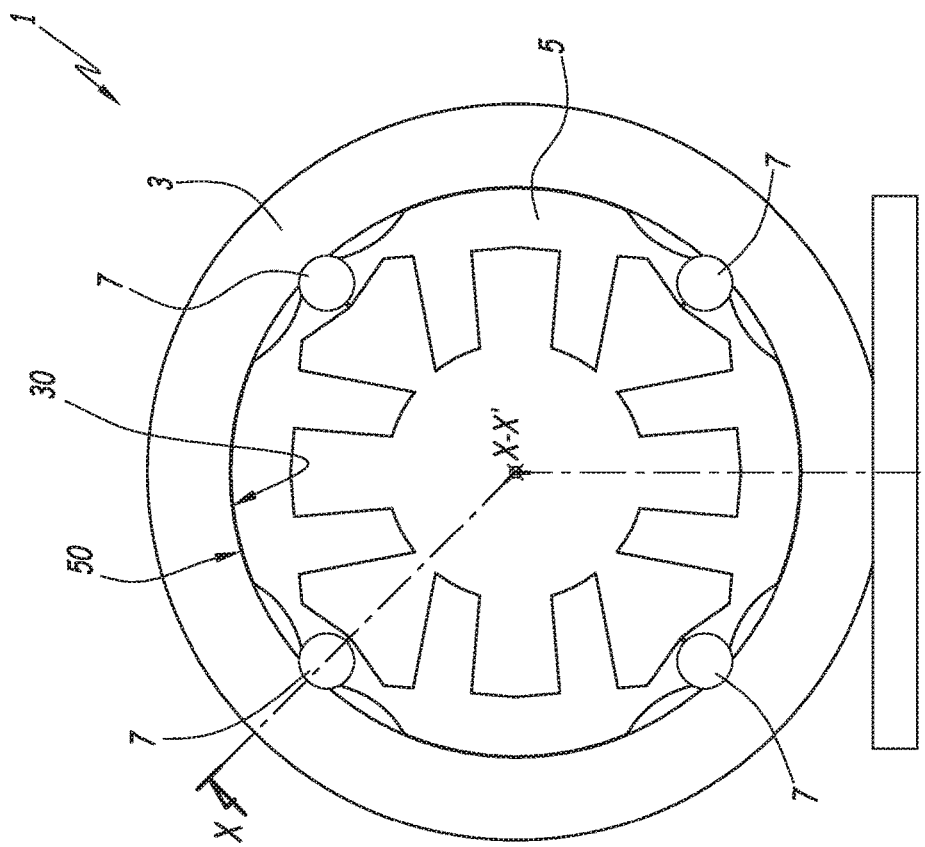
FIG. 9 is a front view of a stator assembly according to a fourth embodiment of the invention.
Figure 11:
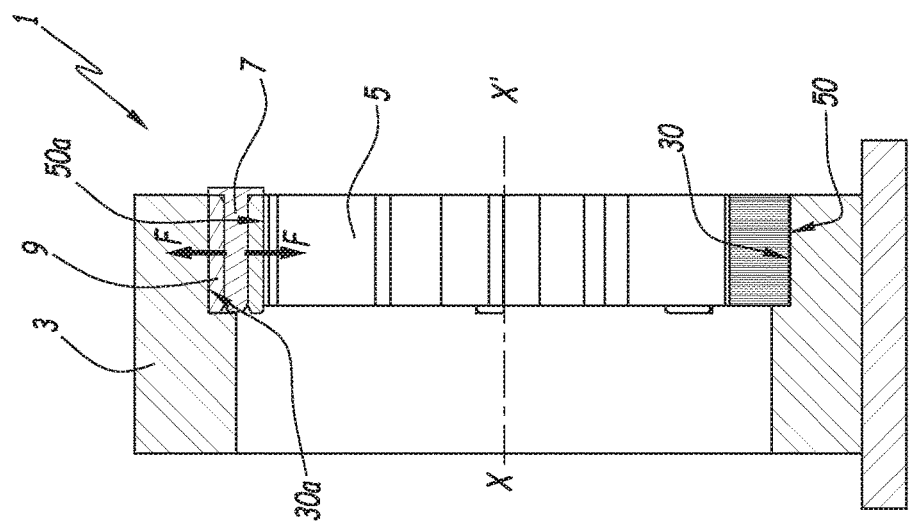
FIG. 11 is a sectional view similar to FIG. 10, in a second configuration.
Figure 10:
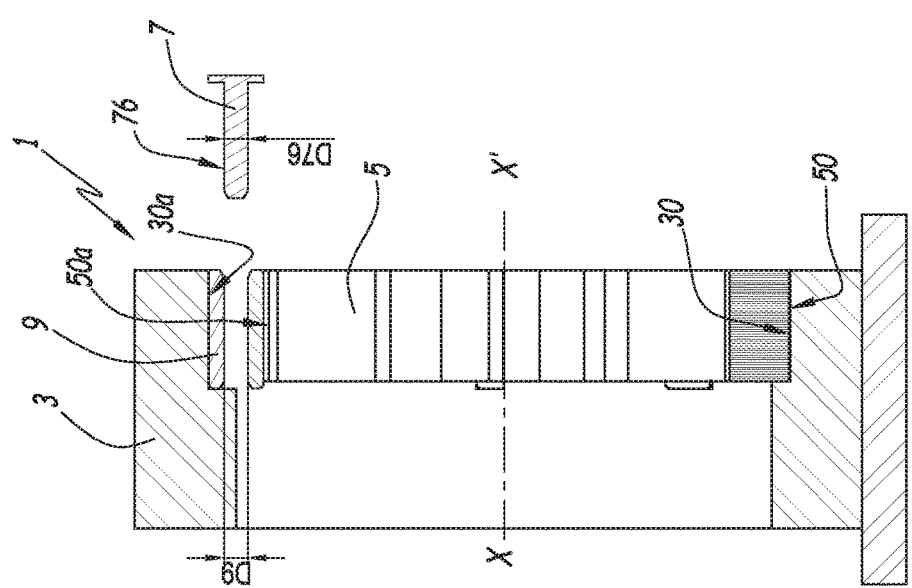
FIG. 10 is a sectional view along plane X-X of the stator assembly of FIG. 9, in a first configuration.

In the embodiment of FIGS. 9 to 11, the stator assembly 1 provides cylindrical sleeves 9 mounted between the recesses 30a and 50a. The fastening elements 7 are mounted in the sleeves 9, and have a global cylindrical shape defining an outer cylindrical surface 76 of a diameter D76 which is superior to an inner diameter D9 of the sleeves 9. The fastening elements 7 may be inserted in the sleeves 9 by force fit, using for example a hydraulic press.

According to a non-shown embodiment of the invention, the stator assembly 1 may provide at least one screw for locking the angular position of the stator 5 with respect to the housing 3. The screw may be inserted into a threaded bore of the housing 3 extending in a centripetal direction relative to the central axis X-X'. The screw exerts a radial force against the radial outer surface 50.

The technical features of the above mentioned embodiments and variants can be combined to form new embodiments of the invention.

The invention claimed is:

1. A stator assembly comprising:
   a housing;
   a stator, the stator concentric with and mounted radially inside the housing, and having at least four fastening elements substantially positioned at four separate parts of the stator and mounted between a radial inner surface of the housing and a radial outer surface of the stator, the at least four fastening elements exerting a radial fastening force on the housing and the stator, wherein the inner radial surface of the housing and the outer radial surface of the stator provide respective recesses for receiving the at least four fastening elements, wherein the recesses of the outer radial surface of the stator have a cylindrical shape defining a diameter equivalent to the outer diameter of the at least four fastening elements; and at least one screw for locking an angular position of the stator to the housing, the screw being inserted into a threaded bore of the housing extending in a centripetal direction and exerts a radial force against the radial outer surface of the stator, wherein the stator having cylindrical sleeves mounted between the recesses of the inner radial surface of the housing and the recesses of the outer radial surface of the stator, wherein the at least four fastening elements are mounted in the cylindrical sleeves, wherein the at least four fastening elements have a global cylindrical shape defining an outer cylindrical surface of a diameter that is greater than the inner diameter of the cylindrical sleeves, and wherein the at least four fastening elements are force fitting located in the cylindrical sleeves.

2. The stator assembly according to claim 1, wherein the stator is made of a unique monolithic part.

3. The stator assembly according to claim 1, wherein the at least four fastening elements have a global cylindrical shape defining an outer cylindrical surface of a diameter that is greater than a maximal distance that extends between the recesses of the inner radial surface of the housing and the recesses of the outer radial surface of the stator.

4. The stator assembly according to claim 3, wherein the at least four fastening elements are directly inserted between the housing and the stator by thermal compression.

5. The stator assembly according to claim 3, wherein the at least four fastening elements are directly inserted between the housing and the stator by force.

6. The stator assembly according to claim 5, wherein the at least four fastening elements provide an internal passage, and the housing includes threaded bores for receiving screws passed through the internal passages of the at least four fastening elements for progressively inserting by force the at least four fastening elements between the housing and the stator.

7. The stator assembly according to claim 3, wherein the at least four fastening elements have a flat longitudinal surface that truncates their outer cylindrical surface.

8. The stator assembly according to claim 7, wherein the at least four fastening elements are adapted to be rotated around their longitudinal axis between a first position, wherein the flat longitudinal surface faces the recess of the housing so that the at least four fastening elements can be inserted between the housing and the stator, and a second position, and wherein the flat longitudinal surface faces the recess of the stator while a portion of the outer cylindrical surface is in contact with the recess of the housing so that the radial force is exerted.

9. The stator assembly according to claim 8, wherein the at least four fastening elements provide an end having a recess adapted for the insertion of a tool for rotating the at least four fastening elements.

10. A magnetic bearing having a stator assembly, the stator assembly comprising:

a housing;

a stator, the stator concentric with and mounted radially inside the housing, and having at least four fastening elements substantially positioned at four separate parts of the stator and mounted between a radial inner surface of the housing and a radial outer surface of the stator, the at least four fastening elements exerting a radial fastening force on the housing and the stator, wherein the inner radial surface of the housing and the outer radial surface of the stator provide respective recesses for receiving the at least four fastening elements wherein the recesses of the outer radial surface of the stator have a cylindrical shape defining a diameter equivalent to the outer diameter of the at least four fastening elements; and at least one screw for locking an angular position of the stator to the housing, the screw being inserted into a threaded bore of the housing extending in a centripetal direction and exerts a radial force against the radial outer surface of the stator, wherein the stator having cylindrical sleeves mounted between the recesses of the inner radial surface of the housing and the recesses of the outer radial surface of the stator, wherein the at least four fastening elements are mounted in the cylindrical sleeves, wherein the at least four fastening elements have a global cylindrical shape defining an outer cylindrical surface of a diameter that is greater than the inner diameter of the cylindrical sleeves, and wherein the at least four fastening elements are force fitting located in the cylindrical sleeves.

11. An electric motor having a stator assembly, the stator assembly comprising:

a housing;

a stator, the stator concentric with and mounted radially inside the housing, and having at least four fastening elements substantially positioned at four separate parts of the stator and mounted between a radial inner surface of the housing and a radial outer surface of the stator, the at least four fastening elements exerting a radial fastening force on the housing and the stator, wherein the inner radial surface of the housing and the outer radial surface of the stator provide respective recesses for receiving the at least four fastening elements wherein the recesses of the outer radial surface of the stator have a cylindrical shape defining a diameter equivalent to the outer diameter of the at least four fastening elements; and at least one screw for locking an angular position of the stator to the housing, the screw being inserted into a threaded bore of the housing extending in a centripetal direction and exerts a radial force against the radial outer surface of the stator, wherein the stator having cylindrical sleeves mounted between the recesses of the inner radial surface of the housing and the recesses of the outer radial surface of the stator, wherein the at least four fastening elements are mounted in the cylindrical sleeves, wherein the at least four fastening elements have a global cylindrical shape defining an outer cylindrical surface of a diameter that is greater than the inner diameter of the cylindrical sleeves, and wherein the at least four fastening elements are force fitting located in the cylindrical sleeves.

* * * * *